(12) United States Patent
Papadopoulos et al.

(10) Patent No.: US 12,484,775 B2
(45) Date of Patent: Dec. 2, 2025

(54) EYE SENSING

(71) Applicant: ams International AG, Jona (CH)

(72) Inventors: Ioannis Papadopoulos, Lausanne (CH); Volker Zagolla, Prilly (CH)

(73) Assignee: ams International AG, Jona (CH)

( * ) Notice: Subject to any disclaimer, the term of this patent is extended or adjusted under 35 U.S.C. 154(b) by 0 days.

(21) Appl. No.: 18/721,895

(22) PCT Filed: Dec. 20, 2022

(86) PCT No.: PCT/EP2022/086952
§ 371 (c)(1),
(2) Date: Jun. 20, 2024

(87) PCT Pub. No.: WO2023/118116
PCT Pub. Date: Jun. 29, 2023

(65) Prior Publication Data
US 2025/0057416 A1  Feb. 20, 2025

(30) Foreign Application Priority Data
Dec. 20, 2021  (EP) ..................... 21386080

(51) Int. Cl.
*G06F 3/01*   (2006.01)
*A61B 3/113*  (2006.01)
(Continued)

(52) U.S. Cl.
CPC .......... *A61B 3/113* (2013.01); *G02B 27/0093* (2013.01); *G02B 27/0172* (2013.01)

(58) Field of Classification Search
CPC ....... G06F 3/013; G06F 3/01; G02B 27/0093; G02B 27/0172; A61B 3/113
See application file for complete search history.

(56) References Cited

U.S. PATENT DOCUMENTS 10,114,222 B2   10/2018  Alexander et al.
10,877,274 B1 *  12/2020  Trail ...................... G02B 27/14
(Continued)

FOREIGN PATENT DOCUMENTS

DE  102016226294 A1   7/2018
WO    2020261279 A1  12/2020

OTHER PUBLICATIONS

European Search Report for corresponding European patent application No. 21386080, dated Jun. 1, 2022, 2 pages (for informaional purposes only).

(Continued)

*Primary Examiner* — Olga V Merkoulova
(74) *Attorney, Agent, or Firm* — Viering, Jentschura & Partner mbB

(57) ABSTRACT

An eye sensing device for integrating in a frame for mounting to a user's head including a laser output unit configured to provide a laser beam for illuminating an eye of the user when in use, and a receiver unit configured to receive reflections of the laser beam and to provide a tracking signal usable for determining a distance or velocity of the eye. The device further includes an optical element configured to apply a first optical function to the laser beam for illuminating the eye and to apply a second optical function to the reflections of the laser beam, and a processing unit for determining a position of the user's eye from the tracking signal.

20 Claims, 12 Drawing Sheets

(51) Int. Cl.
*G02B 27/00* (2006.01)
*G02B 27/01* (2006.01)

(56) References Cited

U.S. PATENT DOCUMENTS

| | | | | |
|---|---|---|---|---|
| 11,156,759 | B2* | 10/2021 | Brick | G02B 26/101 |
| 11,509,835 | B2* | 11/2022 | Ollila | G03B 30/00 |
| 11,754,767 | B1* | 9/2023 | Soskind | G02B 6/35 |
| | | | | 359/350 |
| 12,147,054 | B2* | 11/2024 | Ronen | G02B 27/0172 |
| 2016/0081547 | A1* | 3/2016 | Gramatikov | G01N 21/23 |
| | | | | 356/369 |
| 2020/0043236 | A1* | 2/2020 | Miller | G06F 3/013 |
| 2020/0153203 | A1* | 5/2020 | Hatzilias | H01S 5/183 |
| 2021/0294106 | A1* | 9/2021 | Meitav | H04N 9/31 |
| 2024/0255753 | A1* | 8/2024 | Papadopoulos | G02B 27/0093 |

OTHER PUBLICATIONS

Zhao, J., et al., "Design of a high-resolution holographic waveguide eye-tracking system operating in near-infrared with conventional optical elements", Optics Express, vol. 29, issue 15, 2021, 16 pages.
Vyas, S., et al., "Spatial mode multiplexing using volume holographic gratings", Optics Express, vol. 25, issue 20, 2017, 12 pages.

\* cited by examiner

EYE SENSING

CROSS-REFERENCE TO RELATED APPLICATIONS

This application is a 371 U.S. National Phase of PCT International Patent Application No. PCT/EP2022/086952, filed on Dec. 20, 2022, which claims priority from EP patent application Ser. No. 21/386,080.2, filed on Dec. 20, 2021, the disclosures of which are incorporated by reference herein in their entirety for all purposes.

FIELD OF DISCLOSURE

The present disclosure relates to eye sensing devices, in particular devices such as eye trackers for integrating in a frame for mounting to a user's head, for example in AR smart glasses.

BACKGROUND

Eye tracking is an important user side sensing modality that can enable a diverse set of applications in e.g. Augmented Reality (AR) applications.

State of the art eye tracking sensing modalities rely on imaging of the eye and cornea using an imaging sensor and the identification of the gaze vector based on data processing of the acquired image. Such approaches tend to be of high power consumption, low accuracy, and/or slow data collection. Equally important is that the placement of the imaging sensor is chosen in a way to maximize the quality of the acquired data, leading to placements that are obstructing the field of view in the bearing device.

An ideal eye tracking solution should have low power consumption, be accurate, fast, and have a small form factor with a simple integration in the bearing device. Current systems cannot provide all of these features together.

SUMMARY

To solve at least some of these problems there is provided a device that uses laser light to measure the distance of specific points on the cornea and uses this information to infer the position of the eye.

According to a first aspect of the present disclosure there is provided an eye sensing device (e.g. an eye tracking device) for integrating in a frame for mounting to a user's head (e.g. the frame of a VR or AR headset). The device includes a laser output unit configured to provide a laser beam for illuminating an eye of the user when in use and a receiver unit configured to receive reflections of the laser beam and to provide a tracking signal usable for determining a distance or velocity of the eye. The device further includes an optical element configured to apply a first optical function to the laser beam for illuminating the eye and to apply a second optical function to the reflections of the laser beam, and a processing unit for determining a position of the user's eye from the tracking signal.

The optical element can apply different optical functions to the laser beam in the illumination path (the path from the laser output unit to the eye) and to the laser beam in the return path (the path from the eye to the receiver unit). The optical element can be configured to apply the first optical function in order to focus the laser beam onto the eye or to collimate the laser beam so as to provide plane wave illumination of the eye. Collimating the laser beam can be advantageous for providing a device suitable for different user conditions (e.g. varying human form factors). A substantially collimated beam may also provide additional eye safety compared to a more collected beam. The optical element can be configured to apply the second optical function in order to focus the reflections of the laser beam. For example, the first and second optical function may provide different focusing or in an advantageous embodiment, the first optical function collimates the light while the second optical function focuses the light. The focal length of the second optical function may be in the range of 5 mm to 100 mm, or in the range of 10 mm to 12.5 mm (e.g. about 12 mm), which can provide good angular coverage (range of rotation of the eye) combined with increased power at the receiver. In other embodiments, both the first and second optical functions may provide different focal lengths. That is, the optical element has a first (finite) focal length for light in the illumination path and a second (different) focal length for light in the reception path. Typically, the first focal length is longer than the second focal length.

In order to cause the optical element to apply different optical functions to the illuminating laser beam (in the illumination path) and the reflected laser beam (in the reception path), the optical element can be configured to apply the first optical function to light having a first polarisation and the second optical function to light having a second, different polarisation. The laser output unit can be configured to provide a first polarisation, which is changed (flipped) when the laser beam is reflected from the eye. For example, the laser output unit can be configured to provide a laser beam having right handed circular polarisation so that the reflected light has left handed circular polarisation or vice versa.

The optical element may be polarisation sensitive. For example, the optical element may include a liquid crystal polarisation grating (LCPG). An LCPG can provide an efficient way of providing different optical functions to light having different polarisations. For example, the optical element may include two overlapping layers of different LCPGs (one for each optical function).

In addition or alternatively, the optical element may include an angularly selective grating such as a volume phase grating (VPG). The VPG can be configured to apply an optical function to light having an angle of incidence within a predefined range and/or to light having a wavelength within a predefined range. For example, the optical element may include one layer of VPG and an overlapping layer of LCPG two provide respective optical functions.

The laser output unit can be configured to provide light having a first polarisation state. The optical element can then be configured to apply the first optical function to light in the first polarisation state and the second optical function to light in a second, different polarisation state. For example, the laser output unit may be configured to provide circularly polarised light. The optical element can then be configured to apply the first optical function to light having right handed circular polarisation and to apply the second optical function to light having left handed circular polarisation.

Preferably the eye sensing device provides at least two spatially separated laser beams for illuminating different points on the user's eye, wherein the receiver unit is configured to receive reflections from each laser beam and, for each of the received reflections, provide a tracking signal usable for determining the distance or velocity of the respective points on the eye. Using two or more laser beams can improve the accuracy of the eye-tracking. More preferably, at least three spatially separated laser beams are provided by the laser output unit. Again, the device is configured so that each laser beam illuminates a different point on the user's eye. The receiver unit is configured to receive the reflections from the at least three laser beams and to provide corresponding tracking signals. The tracking signals can then be used to determine the position (e.g. rotational position) of the user's eye (e.g. from the change in distance or from the velocity of the different points of the eye). By using at least three laser beams (from three laser sources) the accuracy can be further improved.

A laser source is used together with the optical element to produce an illumination field over the eye and typically over the cornea of the eye. Depending on the actual geometry, a specific position on the cornea surface will produce a reflection of this illumination field that can be detected. As the cornea is a spherical surface offset from the rotation point of the eye, any rotation of the eye will lead to a displacement of the cornea. This links the cornea target point displacement measured with the laser signal to the rotation of the eye. Because the proposed method infers the eye rotation from the relative distance change of a specific point on the cornea, any eye rotation within a given cone around the starting position leads to the same distance change and therefore an uncertainty between measurement and rotation. To overcome this, further and preferably at least three laser beams with different positions may be used.

When having multiple laser beams, the beams can be distributed symmetrically on the cornea of the user's eye. For example, three laser beams may illuminate three points on the cornea of forming an equilateral triangle. For applications where tracking the rotation of the eye in some directions is more important than in other directions (for example where accurate horizontal tracking is more important than vertical tracking) other distributions of the laser beam illumination on the cornea may be appropriate. For example, a non-symmetrical distribution may be used for some applications.

The spatially separated laser beams may be separated by an angular distance in the range of 0.1° to 30° on the cornea of the user's eye when in use. For example, in a configuration using three laser sources, the laser beams may be separate by a minimum angular distance of about 17°. Other values of the angular distance of laser sources are also possible and may depend on the number of laser beams used. The spatially separated laser beams may contain a number of laser beams in the range of 2 to 12, and preferably at least three for eye-tracking applications. Whilst three laser beams (from three laser sources) can provide accurate eye tracking, more beams may be used to improve eye tracking or to provide redundancy in the system (e.g. should one laser source fail). However, a greater number of sources may increase the complexity and power consumption of the device.

The laser output unit typically includes a laser source (one for each laser beam), such as laser diodes, e.g. edge emitting lasers, distributed feedback (DFB) lasers, distributed bragg reflector (DBR) lasers, or vertical cavity surface emitting lasers (VCSELs). Alternatively, the laser output unit may include an optic waveguide connected to a laser source. The waveguide would typically be a single wave mode fibre optic waveguide. The laser output unit may include multiple waveguides connected to respective laser sources for providing multiple (typically three) laser beams. Hence, the actual laser sources may be located off the integrating device (i.e. off the frame) but connected to the device via the waveguides. The laser source should be very monochromatic (narrowband) and have high coherence for accurate distance/displacement measurements. VCSELs have the advantage of being relatively cheap and have low power consumption. The laser sources may be configured to operate at a wavelength in the infrared or near infrared spectra. For example, the laser sources may be configured to emit light having a wavelength in the range of 800 nm to 1600 nm, e.g. at 940 nm. Longer wavelengths are typically better in terms of eye safety, and can therefore be used with a relatively higher output power, which may provide a better signal.

The laser output unit can also be the receiver unit, wherein the tracking signal is provided by self-mixing interference (SMI). SMI allows for accurate distance/displacement measurements without requiring additional photodiodes for receiving the reflected light. Using SMI, a portion of the illumination light is reflected off the cornea surface and makes its way back to each respective laser source. The reflected light coupled back into the laser cavity interferes with the original laser light leading to a modulation of the laser emission characteristics. Measuring the changes in the laser emission characteristics (e.g. laser power output, junction voltage etc.) can provide information about the relative position change of the remote target (specific points on the cornea surface).

SMI may use optical detection, wherein each tracking signal is determined from an optical output of the respective laser source. For example, a photodiode may be placed close to the laser source and measure the output intensity of the laser source. The photodiode may be integrated in the laser epitaxy or may be located behind the laser source and arranged to monitor the power output on the laser mirror opposite to the eye emission. Alternatively, each tracking signal may be determined from a current or voltage input to the respective laser source. As the SMI affects the laser output it also affects the power supply to the laser source, which can be measured to determine the distance/displacement.

According to a second aspect of the present disclosure there is provided a virtual reality (VR) or augmented reality (AR) headset (e.g. smart glasses) comprising a frame for mounting to a user's head and an eye sensing device according to the first aspect integrated in the frame.

According to a third aspect of the present disclosure there is provided a method of eye sensing. The method includes providing a laser beam, with an optical element, applying a first optical function to the laser beam before illuminating a user's eye with the laser beam, and with the same optical element, applying a second optical function to reflections of the laser beam from the user's eye. The method further includes receiving the reflections of the laser beam after applying the second optical function and providing a tracking signal usable for determining a distance or velocity of the eye, and determining with a processing unit a position of the user's eye from the tracking signal.

The step of applying the first optical function may include applying a first focal length to the laser beam for illuminating the eye, and the step of applying the second optical function includes applying a second, shorter focal length to the reflections of the laser beam. For example, the step of applying the first optical function may include collimating the laser beam in order provide plane wave illumination of the eye (e.g. of the cornea of the eye), and the step of applying the second optical function may include focusing the reflections of the laser beam.

The disclosure provides an eye sensing solution that uses a small number of illumination and detection elements leading to a low complexity solution. By using an optical element on the frame, the sensing module can be flexibly placed on different positions of the device (e.g. on the stem) allowing for unobtrusive eye sensing. Reduced data collection (due to signal read-out from a limited numbers of photodiodes) can lead to increased data rates. By using an optical element with two different optical functions for light in the illumination path and in the reception path respectively, improved SNR can be achieved at the receiver for a given input power.

BRIEF DESCRIPTION OF THE DRAWINGS

Specific embodiments of the disclosure are described below with reference to the accompanying drawings, wherein.

DETAILED DESCRIPTION

Figure 1:
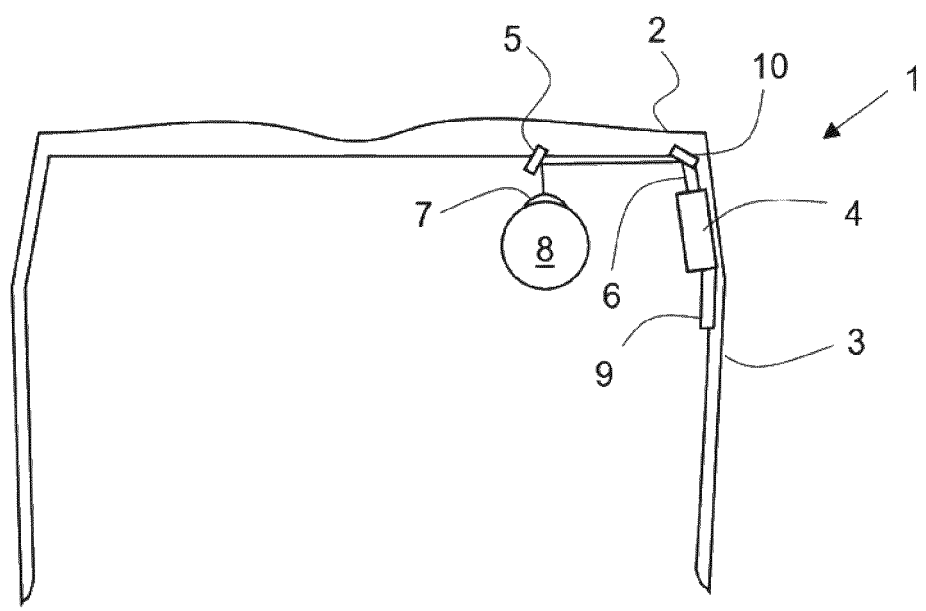
FIG. 1 depicts smart glasses comprising an eye sensing device according to an embodiment of the disclosure.

FIG. 1 shows an eye sensing device 1 integrated in a pair of glasses (e.g. AR smart glasses) comprising a frame 2 having a stem 3. The device 1 includes a laser output unit 4 comprising, for example, three laser sources such as VCSEL lasers, and an optical element 5 for modulating laser beams 6 from the laser output unit 4. The optical element 5 is a reflecting lens (e.g. a Bragg reflector), which provides a plane wave illumination field on the cornea 7 of the eye 8 of the user/wearer of the glasses. A part of the laser beam 6 is reflected back from the cornea 7 and into the laser output unit 4. The optical element 5 focuses incident light reflected from the cornea 7 back towards the laser output unit 4. The laser output unit 4 is also a receiver unit for receiving the reflected light. The reflected light interferes with the laser field in the laser source through so called self-mixing interference, which changes the output of the laser. By monitoring the output intensity of the laser or the input voltage or input current to the laser source, the distance to the cornea 7 and/or the velocity of the cornea 7 can be determined. The device 1 includes a processing unit 9 for determining the distance to the cornea 7 based on self-mixing interferometry (SMI). As the user's eye 8 moves the distance to the reflection point on the cornea 7 shifts, which causes the distance between the laser source and the cornea 7 to change. Hence, the eye movement can be detected. To accurately determine the rotation of the eye in all directions, more than two and preferably at least three angularly separated laser beams 6 are used. More beams may be used for more precise eye tracking and/or to provide redundancy in the system. However, an advantage of using only three laser beams 6 is the possible low power consumption and small form factor. The device 1 also includes a second optical element 10 being a mirror for redirecting the laser beams 6 from the laser output unit 4. Further optical elements can provide greater flexibility in the placement of the laser output unit 4.

In other embodiments, the laser output unit 4 may be placed in the frame in front of the eye 8 and transmit the laser beams 6 onto the eye 8 through the optical element 5, without requiring a reflective element. Also, it is not necessary to have the laser sources in the laser output unit 4. Instead the laser sources may be placed off the device and be connected to waveguides for transmitting the laser beams 6.

The embodiment provides an eye-tracking device 1 with a small number of illumination and detection devices to measure the relative depth change of specific points on the cornea 7 and use this information to infer the gaze direction of the eye 8. The SMI signal used to detect the depth change of each point can be measured, with an integrated photodiode in the laser source, or via direct measurement of the gate voltage. The use of laser illumination and detection enables the combination of the sensing module with highly transparent and efficient reflective optical components placed in the eyepiece. This can allow for the flexible placement of the sensing module within the stem 3 of head wearable devices. The combination of SMI detection (capable of measuring very small depth changes of the point of interest) together with the placement of the various illumination and detection sources in a particular geometry enables very high accuracy over the full eye rotation space. Finally, the solution comprising of a minimum of three sources (each one being potentially a lower power consuming VCSEL) leads to an overall low power consumption.

Figure 2A:
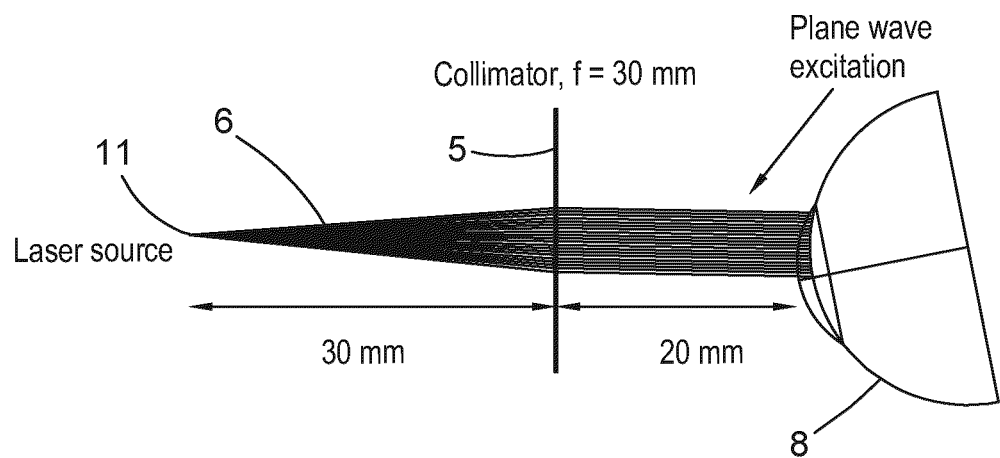
FIG. 2A depicts a part of an eye-tracking device according to an embodiment illustrating light in the illumination path.

FIG. 2A is a schematic diagram of a part of an eye-tracking device comprising a laser source 11 (e.g. a VCSEL) providing a diverging laser beam 6, and an optical element 5 configured to collimate the laser beam 6 to provide plane wave illumination of an eye 8. In this particular embodiment, the optical element 5 has a focal length (f) of 30 mm (for light in the illumination path) corresponding to the distance from the laser source 11.

Figure 2B:
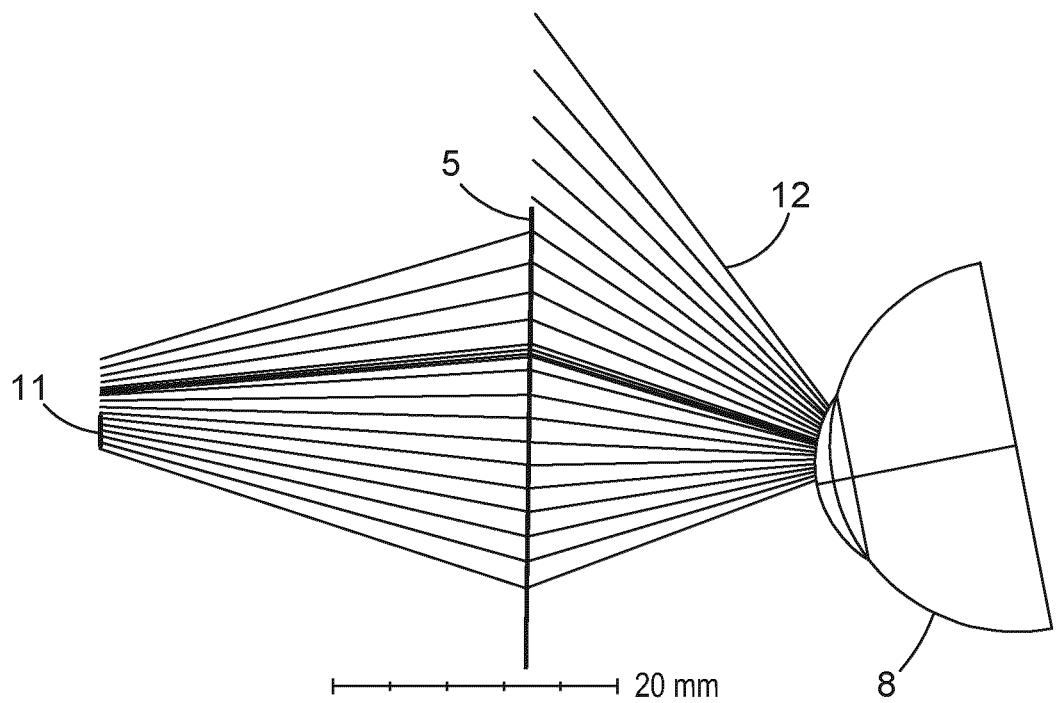
FIG. 2B depicts the part of the eye-tracking device according to an embodiment illustrating light in the detection path.

FIG. 2B shows the part of the eye-tracking device with light in the detection path with reflections 12 of the laser beam 6 from the eye 8. The reflections 12 are diverging from the eye 8 because of the curvature of the cornea. The optical element 5 is configured to focus the light in the detection path. The optical element 5 causes the reflected beam 12 to converge towards the detection plane at the laser source 11, which can lead to an increased portion of the original illumination making it back to the laser source 11. In this embodiment, the optical element 5 has a focal length (f) of 15 mm in the detection path (i.e. half the focal length for the illumination path). Hence, by applying different optical functions to the laser light in the illumination path and in the detection path respectively, improved signal strength for a given laser power can be achieved. Whilst FIGS. 2A and 2B depict an optical element 5 configured to transmit light through the optical element 5, in other embodiment the optical element 5 may be reflective.

Figure 3A:
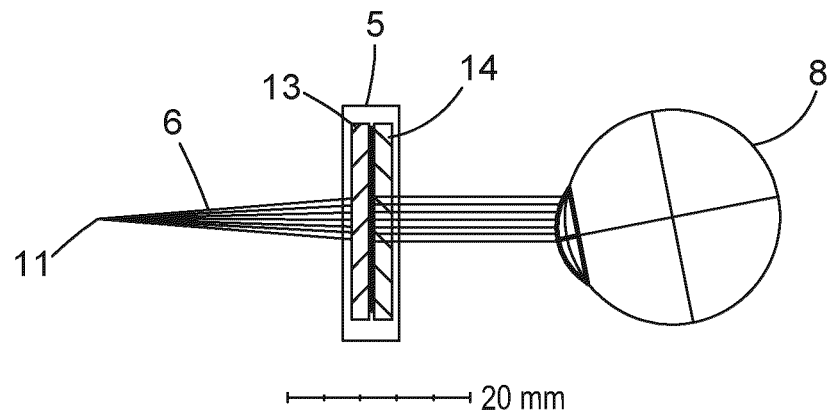
FIG. 3A depicts a part of an eye-tracking device with an optical element acting on light in the illumination path.
Figure 3B:
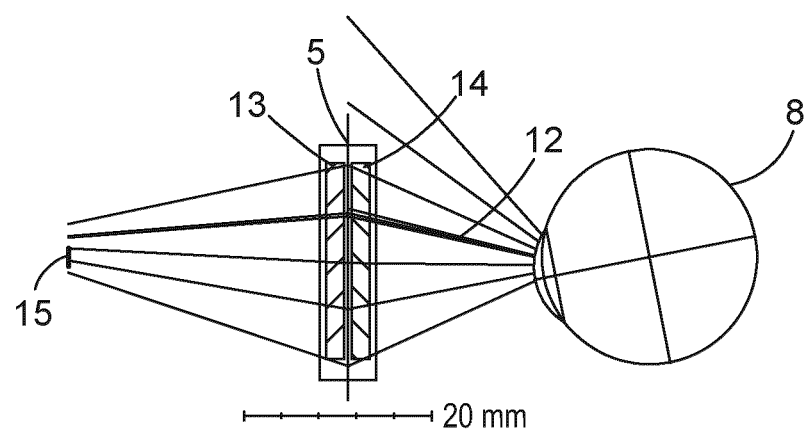
FIG. 3B depicts a part of the eye tracking device with the optical element acting on light in the detection path.

FIGS. 3A and 3B show an embodiment of an eye-tracking device wherein, FIG. 3A shows the illumination path and FIG. 3B shows the detection path. The optical element 5 includes two layers 13 and 14 for applying respective optical functions to light in the illumination path and light in the detection path. The first layer 13 (e.g. comprising an LCPG or other polarization sensitive optical element) applies a first optical function to laser beam 6 in the illumination path. For example, the first layer 13 may be configured to only act on light having a first polarization state and the laser source 11 can be configured to emit light having the first polarization state. The second layer (e.g. comprising an LCPG or VPG) applies a second (different) optical function to reflected laser beam 12 in the detection path. For example, the second layer 14 may be configured to only act on light having a second polarization state (typically the opposite state to the first polarization state). The second optical function collects the light towards receiver unit 15 (which may be the laser source 11).

In one embodiment, the first layer 13 of the optical element 5 may be configured to act on right-handed circularly polarized light, while the second layer 14 of the optical element 5 is configured to act on left-handed circularly polarized light. As light is reflected from the eye 8, right-handed circularly polarized light will flip polarization to left-handed circularly polarized light allowing the optical element 5 to distinguish between light in the illumination path and light in the detection path.

Figure 4:
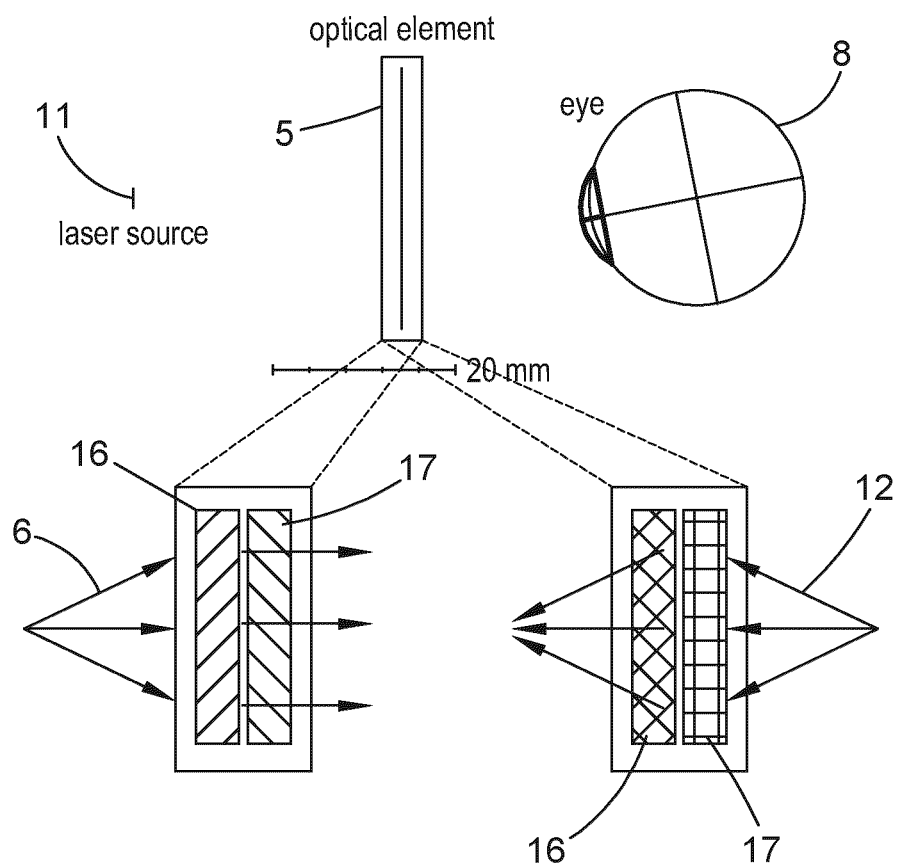
FIG. 4 depicts a part of an eye-tracking device with an optical element comprising two overlapping layers of Liquid Crystal Phase Gratings (LCPGs)

FIG. 4 shows a part of an eye-tracking device 1 comprising an optical element 5 having two LCPGs 16 and 17 for acting on light in the illumination path and the detection path respectively. The first LCPG 16 collimates light 6 from the laser, while the second LCPG 17 collects the diverging reflection 12 from the eye 8. For example, the first LCPG may have a focal length of 30 mm while the second LCPG 17 may have a focal length in the range of 10 to 15 mm.

Figure 5B:
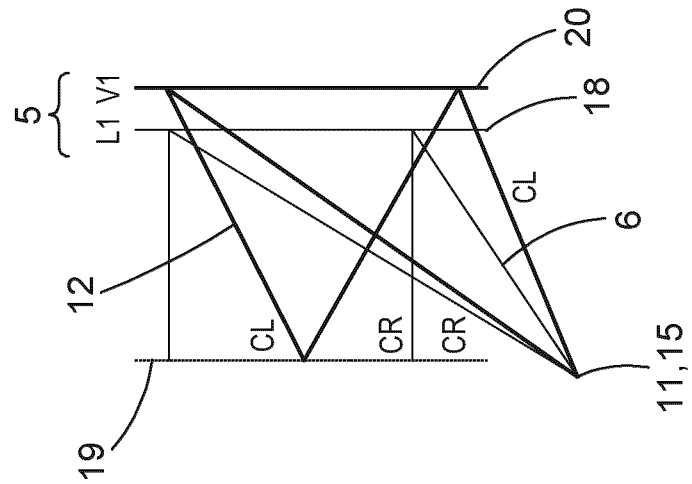
FIG. 5B depicts a schematic diagram of the light path from source to receiver in a folded view.
Figure 5A:
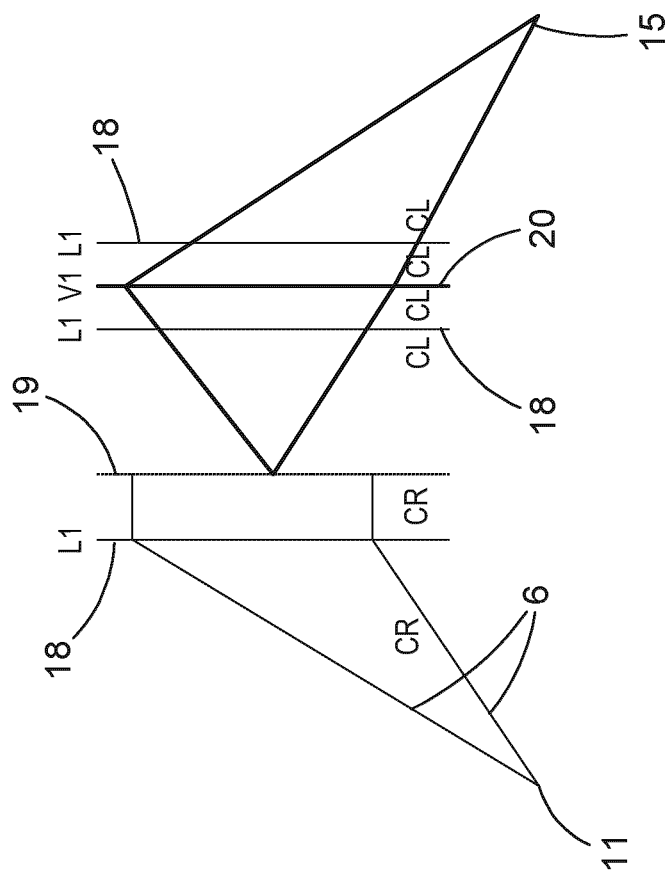
FIG. 5A depicts a schematic diagram of the light path from source to receiver in an unfolded view.

FIGS. 5A and 5B are schematic diagrams showing an unfolded and a folded view of the light path of an eye-tracking device according to an embodiment, wherein the optical element 5 includes a layer of LCPG and a layer of VPG to apply the different optical functions. A laser source 11 emits a laser beam 6 having right-handed circularly polarized light (CR). The laser beam 6 is acted on by a LCPG 18 (L1) configured to act on circularly polarized light, which reflects and collects the laser beam 6 onto a reflective surface 19 (representing the user's eye). The reflective surface 19 causes diverging reflections 12 having left-handed circular polarization (CL). The reflections 12 pass through the LCPG 18 without being affected (since the LCPG does not act on lefthanded circularly polarized light) and to a VPG 20 (V1), which is configured to collect incident light without flipping the polarization. Hence, light reflected from the VPG 20 passes back through the LCPG 18 without being acted on by the LCPG 18 and onto the receiver unit 15. The LCPG 18 and VPG 20 have different focal lengths, so that different optical functions are applied to the light in the illumination path and to the light in the detection path.

Figure 6:
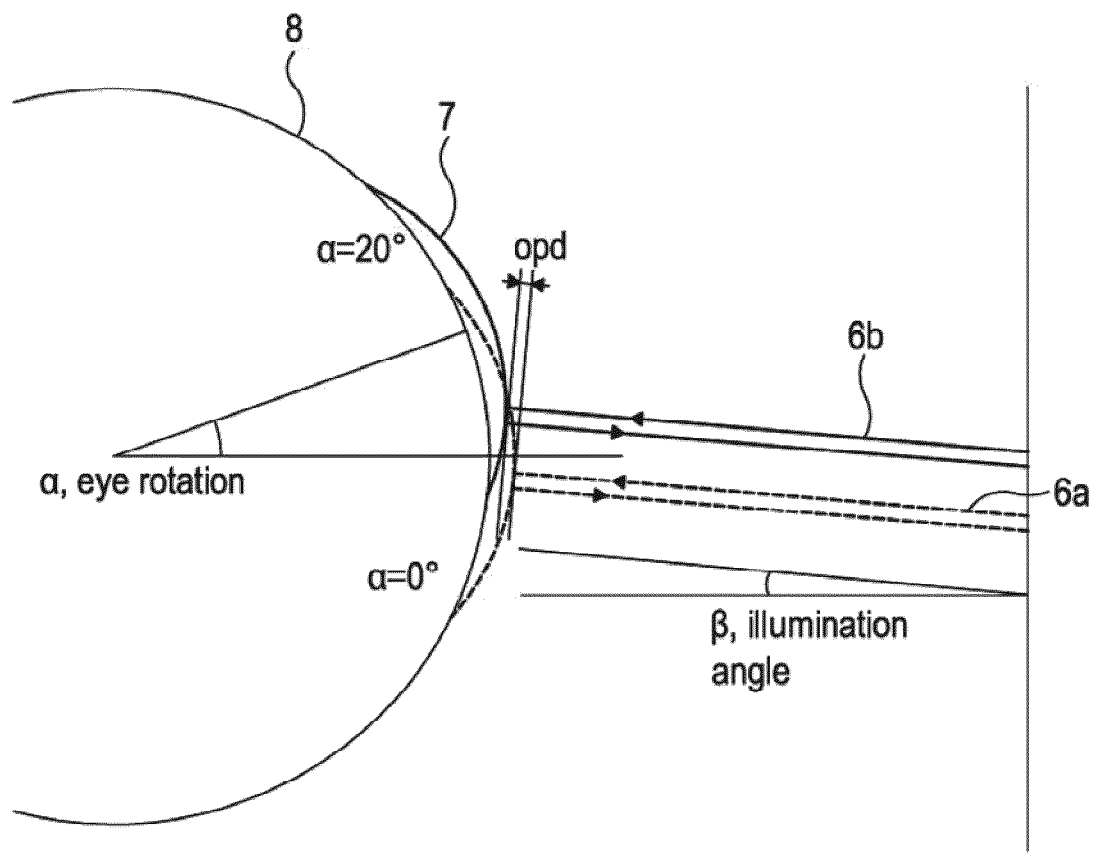
FIG. 6 depicts the optical path difference (OPD) due to a 20° rotation of the eye.

FIG. 6 illustrates how rotation of the eye 8 changes the optical path when using plane wave illumination, which thereby gives rise to a measurable signal. A laser beam 6a having an illumination angle p is incident on and reflected from a point on the cornea 7 of the eye 8 when the eye 8 is in a first position (eye rotation a=0°). Based on the input angle p, there is one point on the cornea 7 that, due to the local curvature, will reflect light at the same angle as the incident angle and back to the receiver unit (not shown). This point remains the same relative to the centre of the cornea 7 when the eye 8 rotates. The eye 8 is rotated into a second position (a=20°), in which the laser beam 6b is incident on and reflected from a point on the cornea 7 and back to the receiver unit. The change in distance of the optical path (the optical path difference, OPD) of the reflected laser beams 6a and 6b between the cornea 7 and the receiver unit depends on the angle of rotation a and can therefore be measured to determine the eye rotation.

Figure 7:
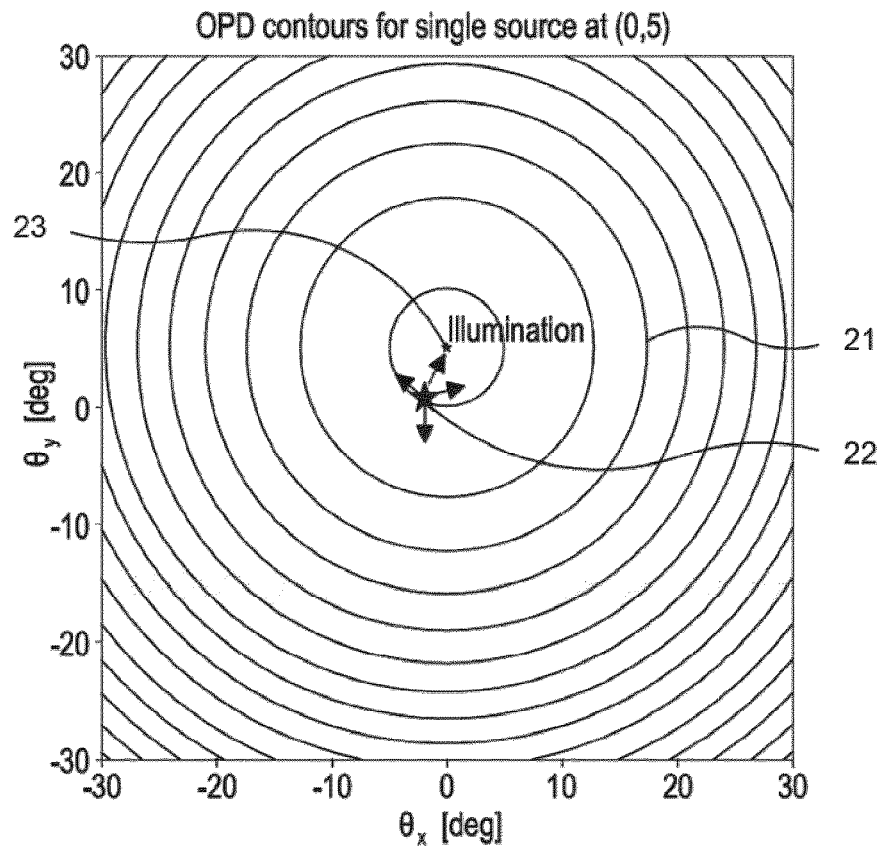
FIG. 7 depicts the contour lines of OPD for one laser source.

FIG. 7 shows how the OPD changes with the angle of rotation. In particular, contour lines 21 are shown, for which the OPD is constant. A star indicates an arbitrary position 22 in rotation space of the eye, and arrows indicate possible directions of rotation of the eye. The central point 23 indicates the position of the laser illumination on the cornea. The most accurate measurements (corresponding to the largest OPD) are possible for rotation in a direction perpendicular to the contour lines 21. Conversely, rotation following the tangent of the contour lines 21 does not change the OPD and therefore has the worst accuracy.

Figure 8:
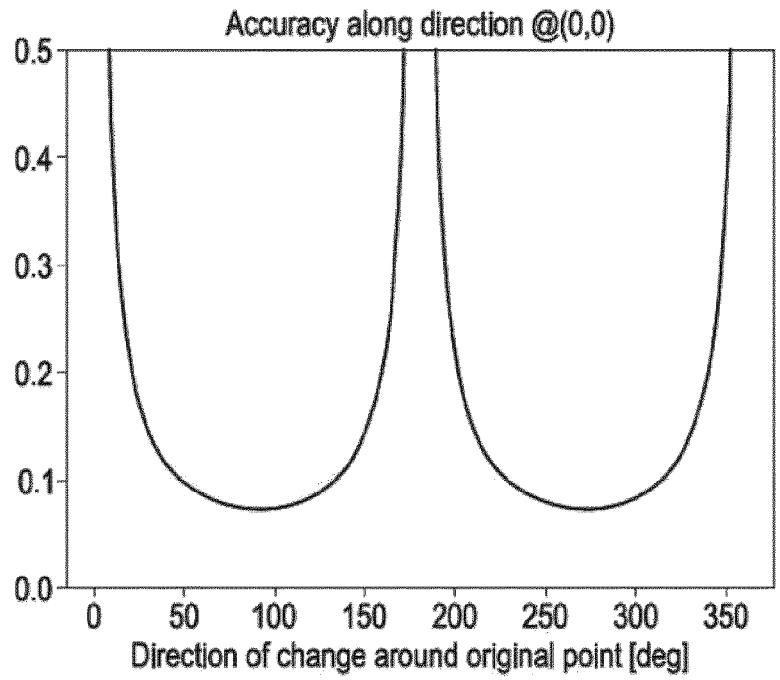
FIG. 8 depicts a graph plotting the accuracy of measurements of rotation against the direction of rotation for one laser source.

The accuracy as a function of the angle of rotation from any given position is illustrated in FIG. 8. The accuracy can be defined as the smallest determinable change in angle, so that a large number indicates a poor accuracy (low resolution) and a small number indicates a good accuracy (high resolution). As can be seen from FIG. 11, rotation in a tangential direction along the OPD line 21 (i.e. 0=0° or 0=180°) has the worst accuracy, whilst rotation in a perpendicular direction (i.e. 0=90° or 0=270°) has the best accuracy. The accuracy as a function of the angle of rotation can be expressed by the following equation:

$$\text{accuracy}[deg] = \frac{\lambda}{2} |\nabla_v OPD(\theta)|^{-1}$$

Figure 9:
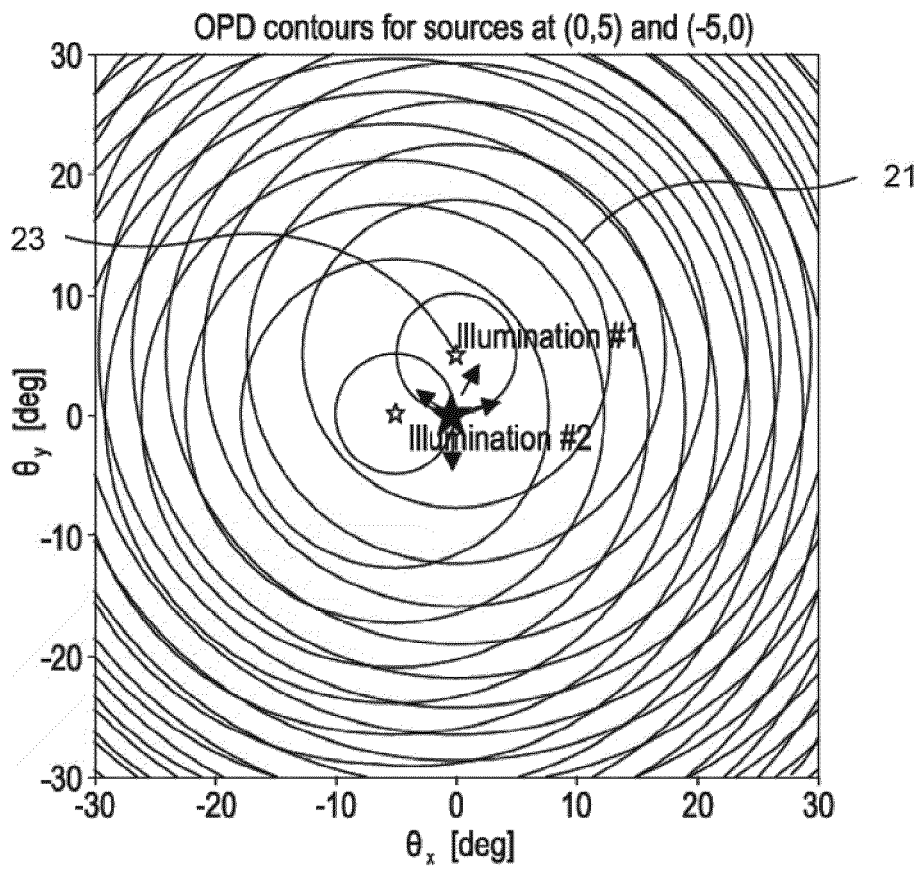
FIG. 9 depicts the contour lines of OPD for two laser sources.
Figure 10:
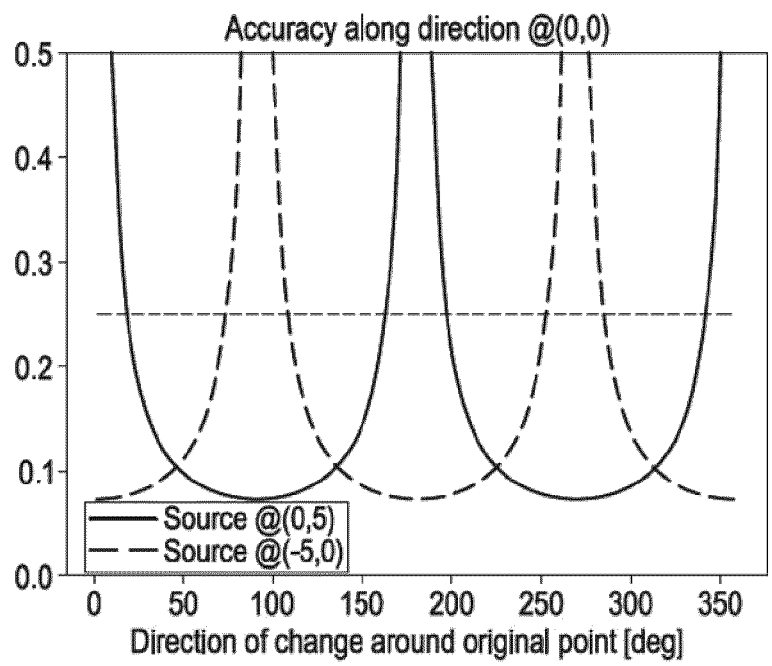
FIG. 10 depicts a graph plotting the accuracy of measurements of rotation against the direction of rotation for two laser sources.

To solve this problem, further laser beams can be provided. FIGS. 9 and 10 show the OPD contour lines 21 and corresponding accuracy plot for two laser sources providing two spatially separated laser beams for illuminating the cornea. As can be seen from the graph in FIG. 10, by using two sources as shown, the accuracy of at least one source will always be less than 0.25 degrees (indicated by the dashed line).

Figure 11:
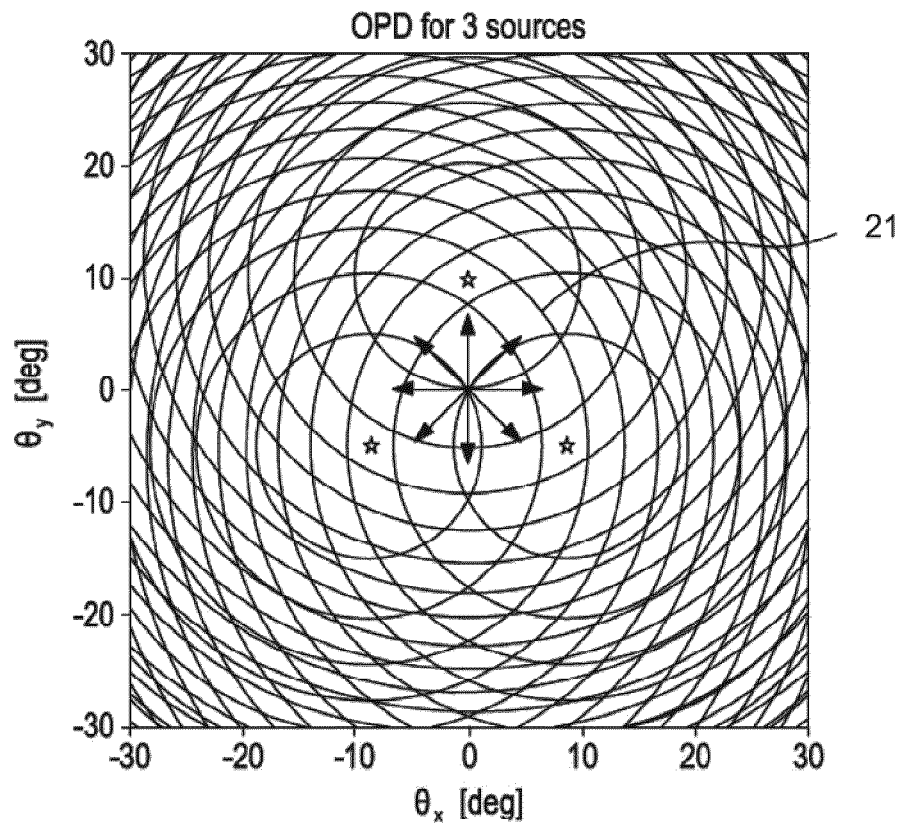
FIG. 11 depicts the contour lines of OPD for three laser sources.
Figure 12:
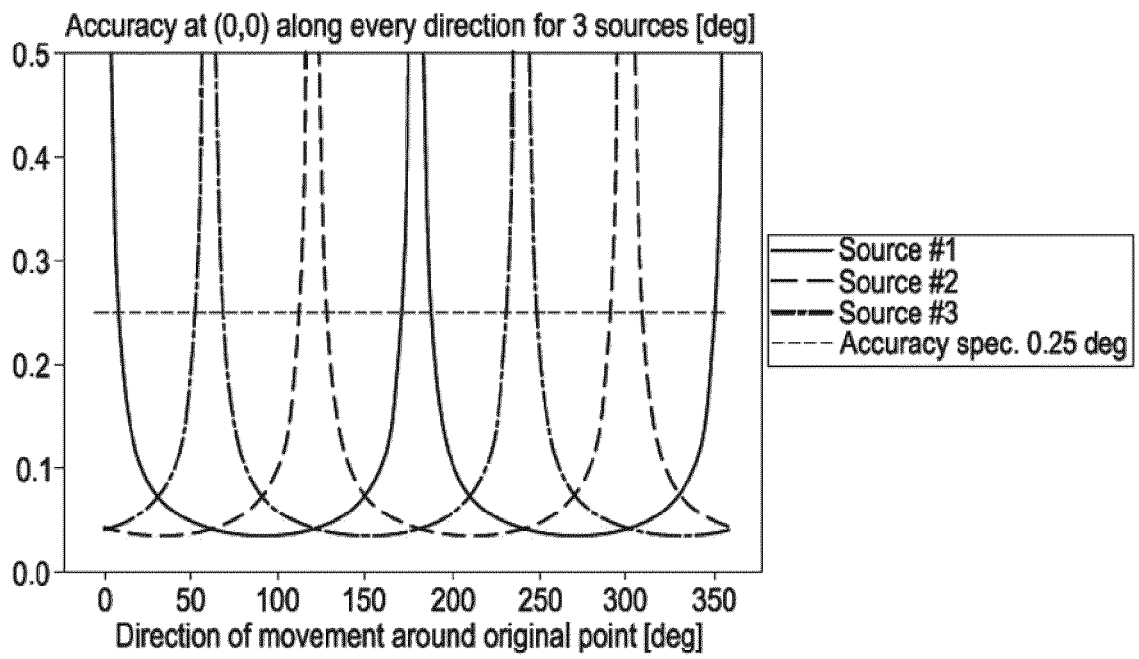
FIG. 12 depicts a graph plotting the accuracy of measurements of rotation against the direction of rotation for three laser sources.

FIGS. 11 and 12 show the OPD contour lines 21 and corresponding accuracy for a configuration comprising three laser sources. Each laser beam is separated by an angle of 17°, which provides an accuracy of less than approximately 0.05 degrees in all directions from any position on the cornea.

Figure 13:
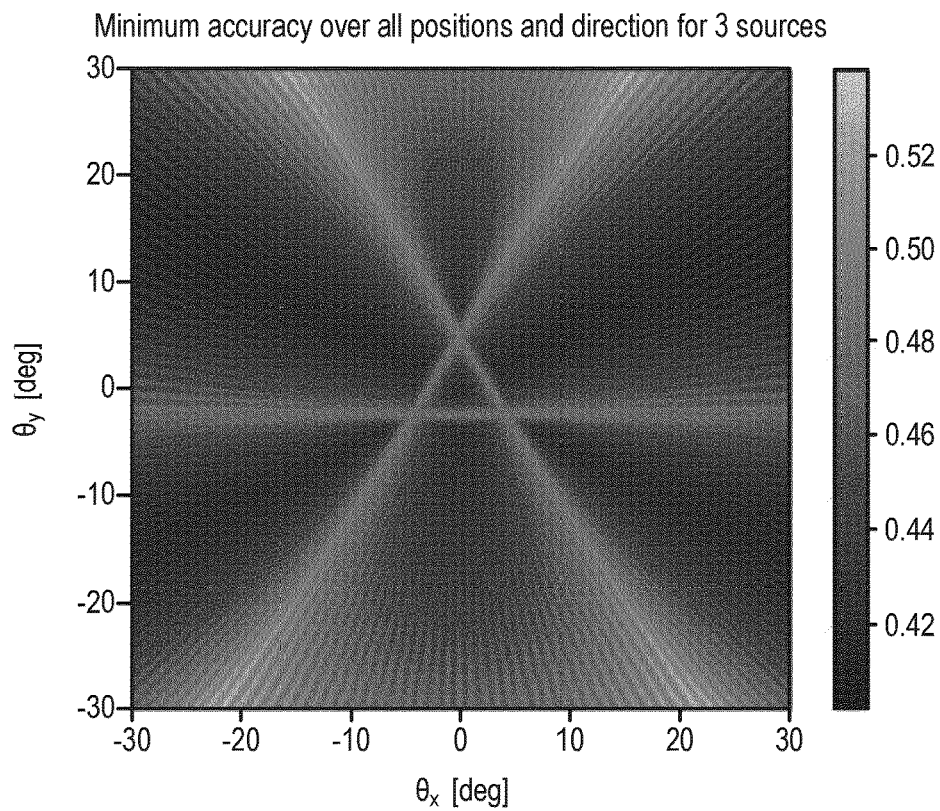
FIG. 13 depicts graph of the minimum accuracy for rotation in any direction using a three laser source configuration with 17° angular distance between laser beams and for any rotation position of the eye from −30° to 30° about the x and y axes.

FIG. 13 plots the minimum accuracy for rotation in any direction using the three laser source configuration with 17° angle between laser beams for any rotation position of the eye from −30° to 30° about the x and y axes. As can be seen from the plot, only relatively small regions have a minimum accuracy worse than 0.05 degrees for movement/rotation in any direction.

Figure 14:
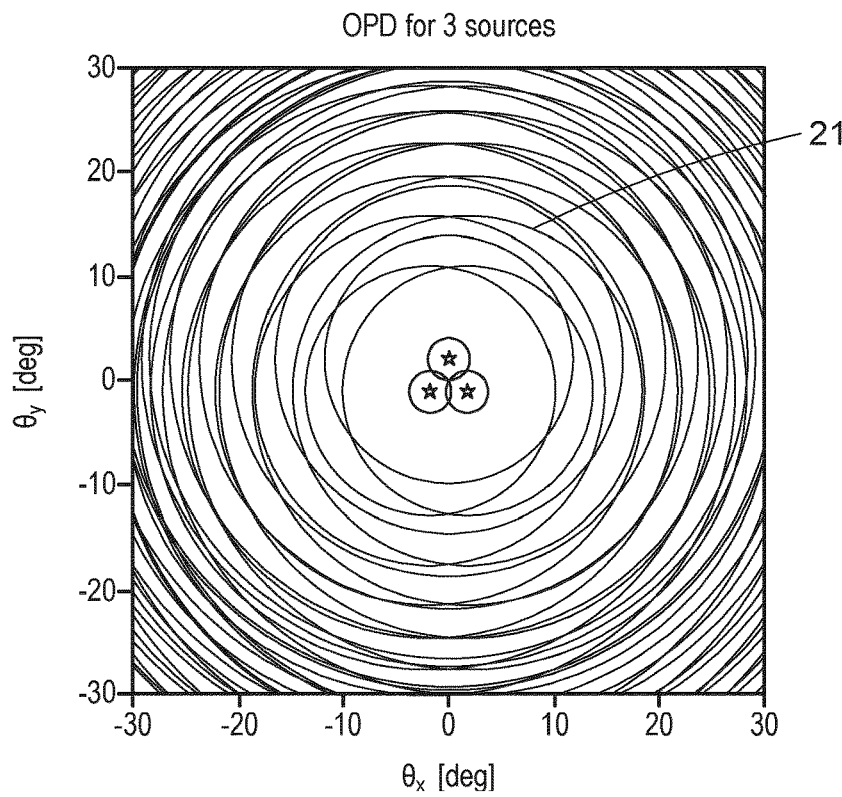
FIG. 14 depicts the contour lines of OPD for three laser sources separated by an angular distance of 3.5°.
Figure 15:
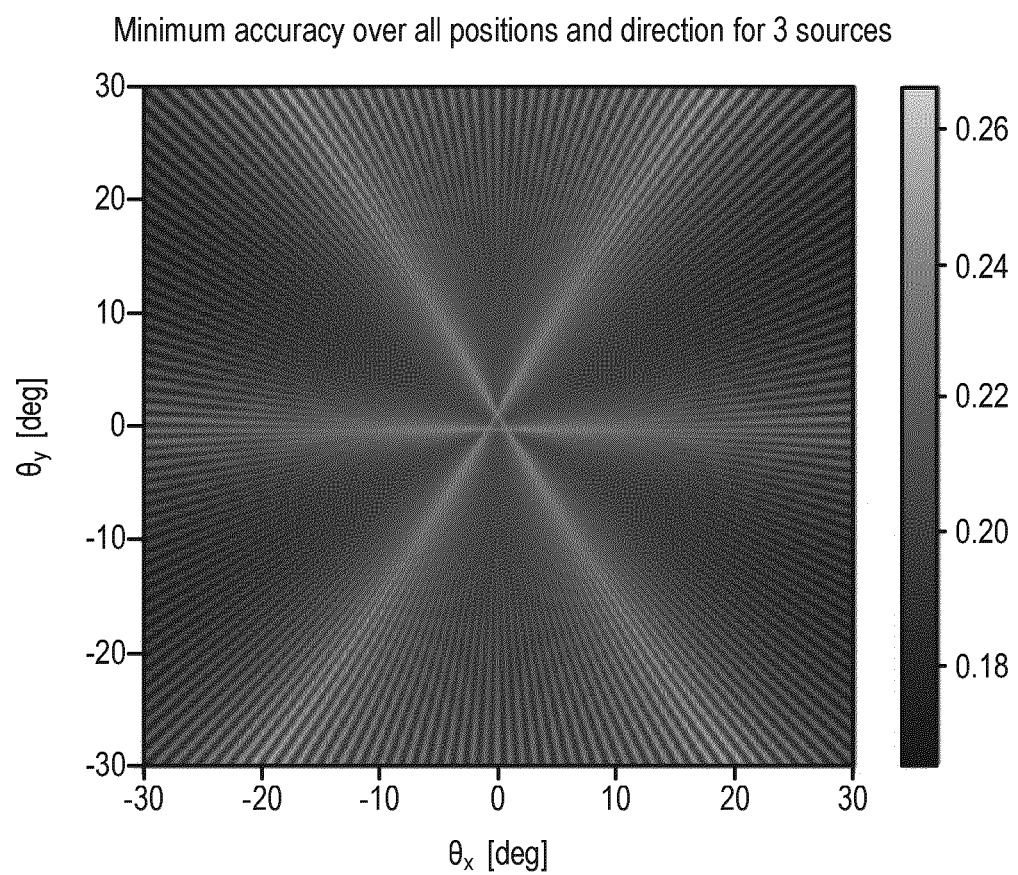
FIG. 15 depicts graph of the minimum accuracy for rotation in any direction using a three laser source configuration with 3.5° angular distance between laser beams and for any rotation position of the eye from −30° to 30° about the x and y axes.

FIG. 14 shows the OPD contour lines 21 for a device providing three laser beams separated by an angular distance of 3.5°. FIG. 15 shows a corresponding plot of the minimum accuracy for rotation in any direction from any rotational position of the eye within −30° to 30° about the x and y axes. As can be seen from the plot, the accuracy is not as good as for the 17° configuration of three sources. The minimum accuracy is approximately 0.25 degrees (compared to 0.05 degrees for the 17° configuration). Hence, reducing the angle between the laser sources worsens the accuracy.

Figure 16:
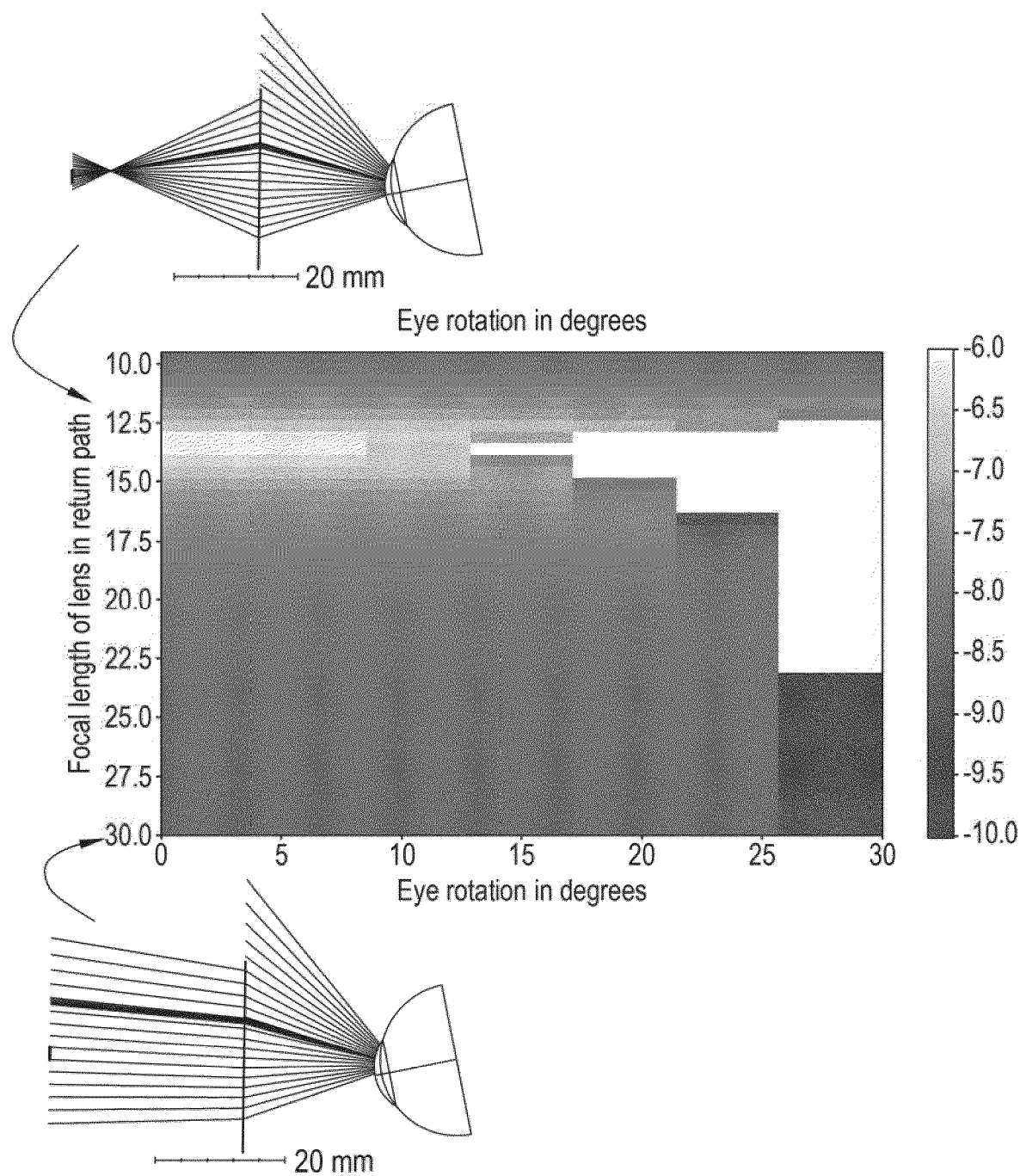
FIG. 16 depicts a graph of the optical collection efficiency at a receiver as a function of eye rotation and focal length in the return path.

FIG. 16 shows a plot of the optical collection efficiency as a function of eye rotation (on the x-axis) and the focal length of the optical function acting on light in the detection path (on the y-axis). For small eye rotations (e.g. <12°) there is a clear increase in the collection efficiency for a focal length between 12.5 mm and 15 mm. However, for larger eye rotations (e.g. >15°) there are no readings as the light is reflected as such an angle that the light is not collected at the receiver. Hence, a good range for the focal length in the return path may be 10 mm to 12.5 mm, which provides increased collection efficiency at the receiver while also avoiding blind spots for large eye rotations.

Although specific embodiment have been described above, the claims are not limited to those embodiments. Each feature disclosed may be incorporated in any of the described embodiments, alone or in an appropriate combination with other features disclosed herein.

REFERENCE NUMERALS

1 Eye sensing device
2 Frame
3 Stem
4 Laser output unit
5 Optical element
6 Laser beam
7 Cornea
8 Eye
9 Processing unit
10 Second optical element
11 Laser source
12 Reflections
13 First layer
14 Second layer
15 Receiver unit
16 First LCPG
17 Second LCPG
18 LCPG
19 Reflective surface
20 VPG
21 Contour lines
22 Eye position
23 Central point

The invention claimed is:

1. An eye sensing device for integrating in a frame for mounting to a user's head, the device comprising:
   a laser output unit configured to provide a laser beam for illuminating a point on a cornea of an eye of the user when in use;
   a receiver unit configured to receive reflections of the laser beam from the cornea and to provide a tracking signal usable for determining a distance or velocity of the eye, wherein the tracking signal comprises a relative change in a distance of the optical path of the reflected laser beam between a reflection point on the cornea and the receiver unit;
   an optical element including a first layer and a second layer, the first layer configured to apply a first optical function to the laser beam for illuminating the eye and the second layer configured to apply a second optical function to the reflections of the laser beam; and
   a processing unit configured to determine a position of the user's eye from the tracking signal.

2. The eye sensing device according to claim 1, wherein the optical element is configured to apply the first optical function in order to collimate the laser beam so as to provide plane wave illumination of the eye.

3. The eye sensing device according to claim 2, wherein the optical element is configured to apply the second optical function in order to focus the reflections of the laser beam.

4. The eye sensing device according to claim 3, wherein the focal length of the second optical function is in the range of 10 mm to 12.5 mm.

5. The eye sensing device according to claim 1, wherein the optical element is configured to apply the first optical function to light having a first polarization and the second optical function to light having a second, different polarization.

6. The eye sensing device according to claim 5, wherein the laser output unit is configured to provide light having the first polarization.

7. The eye sensing device according to claim 1, wherein the laser output unit is configured to provide laser light having a wavelength in the range of 800 nm and 1600 nm.

8. The eye sensing device according to claim 1, wherein the optical element comprises a liquid crystal polarization grating, LCPG.

9. The eye sensing device according to claim 1, wherein the optical element comprises an angularly selective grating.

10. The eye sensing device according to claim 9, wherein the optical element comprises a volume phase grating, VPG.

11. The eye sensing device according to claim 1, wherein the laser output unit is configured to provide at least three spatially separated laser beams, and wherein the receiver unit is configured to receive reflections of the at least three spatially separated laser beams.

12. The eye sensing device according to claim 1, wherein the laser output unit is also the receiver unit and the tracking signal is provided by self-mixing interference.

13. A virtual reality, VR, or augmented reality, AR, headset comprising a frame for mounting to a user's head and an eye sensing device according to claim 1 integrated in the frame.

14. The eye sensing device according to claim 1, wherein the processing unit is configured to determine an angle of rotation of the eye based on the relative change in the distance of the optical path of the reflected laser beam.

15. The eye sensing device according to claim 11, wherein the at least three spatially separated laser beams are separated from each other by a minimum angular distance of about 17 degrees to illuminate at least three different points of the cornea, and wherein the processing unit is configured to determine an angle of rotation of the eye based on relative changes in the distance of the optical paths of reflected laser beams for each of the at least three spatially separated laser beams.

16. The eye sensing device according to claim 11, wherein the at least three spatially separated laser beams are distributed symmetrically on the cornea.

17. The eye sensing device according to claim 1, wherein the laser output unit is configured to measure changes in the laser emission characteristics of the laser output unit to determine the relative change in the distance of the optical path of the reflected laser beam.

18. A method of eye sensing comprising:
   providing a laser beam;
   with an optical element including a first layer and a second layer, applying a first optical function with the first layer to the laser beam before illuminating a point on cornea of a user's eye with the laser beam;
   with the optical element, applying a second optical function with the second layer to reflections of the laser beam from the user's eye;
   receiving the reflections of the laser beam from the cornea after applying the second optical function and providing a tracking signal usable for determining a distance or velocity of the eye, wherein the tracking signal comprises a relative change in a distance of the optical path of the reflected laser beam between a reflection point on the cornea and the receiver unit; and
   determining a position of the user's eye from the tracking signal.

19. The method according to claim 18, wherein the step of applying the first optical function comprises applying a first focal length to the laser beam for illuminating the eye, and the step of applying the second optical function comprises applying a second, shorter focal length to the reflections of the laser beam.

20. The eye sensing device according to claim 16, wherein the at least three spatially separated laser beams form an equilateral triangle.

* * * * *